UNITED STATES PATENT OFFICE.

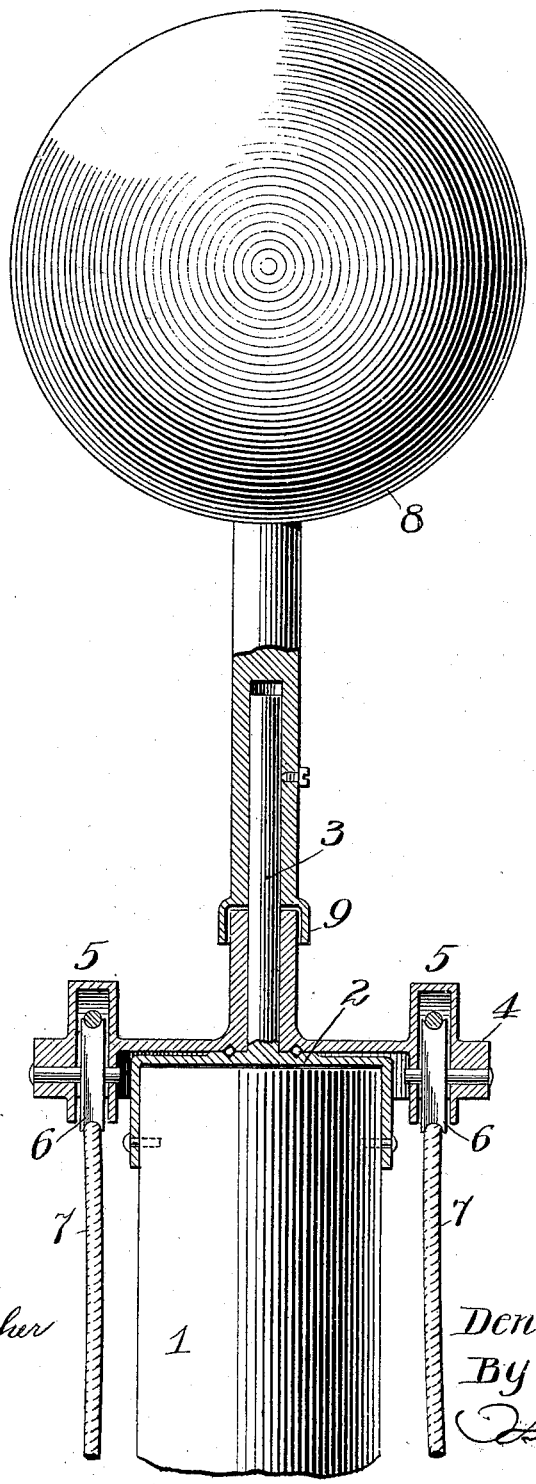

DENISON P. CHESEBRO, OF NEW ROCHELLE, NEW YORK.

FLAGSTAFF-TRUCK.

SPECIFICATION forming part of Letters Patent No. 638,095, dated November 28, 1899.

Application filed June 7, 1899. Serial No. 719,689. (No model.)

*To all whom it may concern:*

Be it known that I, DENISON P. CHESEBRO, a citizen of the United States, and a resident of New Rochelle, in the county of Westchester and State of New York, have invented a certain new and useful Flagstaff-Truck, of which the following is a specification.

This invention relates to a cap and truck for flagstaffs, and has for its object the construction of such device in a manner that will insure protection for the upper end of the staff and also such as will insure the rotation of the truck about the central axis.

Flagstaffs tipped in the manner now in vogue quickly decay at their upper end and trucks that are when mounted intended for rotation become in a short time warped or swelled to such an extent that they will not rotate.

The present invention obviates these difficulties; and it consists in the formation and construction of parts, as hereinafter fully described and claimed.

In the drawing which accompanies this specification there is represented the upper end of a flagstaff with the improved cap and truck applied thereto and the whole surmounted by the usual ball.

1 indicates the flagstaff, and 2 the cap, which is preferably secured thereto by screws passing through the sides thereof, as indicated. This cap has arising from its center a rod or pin, as 3, which may be formed integrally with the cap or brazed therein, as preferred. The cap is slightly thickened or raised for a distance around said pin to form a suitable bearing-surface for the truck. A ball-bearing may be interposed at this point, as indicated. The truck is indicated at 4 and has a central perforated projection or neck, by means of which it is pivoted upon the pin 3. It also has a depending flange at its outer edge, and near its periphery, at opposite sides, it has formed therein housings, as 5, in which are pivoted sheaves 6, over which pass the halyards, as indicated at 7.

The ball 8 is secured by its stem to the pin 3 in any suitable manner, and the stem is preferably provided at its lower end with a flange, as 9, which projects over the neck of the truck. This will prevent any rain from getting into the bearing of the truck upon the pin 3, and thereby prevent corrosion at that point.

The truck, pin, and cap being made of metal and the pin formed integrally with or secured in a water-tight manner in the cap, it is impossible for any rain to get to the upper end of the flagstaff, and therefore said end will be protected from decay.

The invention claimed is—

1. The combination with the flagstaff of the cap 2, fitted over the end thereof and attached to the staff by screws or pins passing through the sides of the cap, a vertical pin as 3, arising from said cap, a truck as 4, journaled upon said pin and having a downwardly-projecting flange, housings formed on opposite sides of said truck, and sheaves journaled in said housings, substantially as and for the purpose set forth.

2. The combination with the flagstaff of the cap 2, fitted over the end thereof and attached to the staff by screws or pins passing through the sides of the cap, a vertical pin as 3, arising from said cap, a truck as 4, journaled upon said pin and having a downwardly-projecting flange and an upwardly-extending neck, housings formed on opposite sides of said truck, sheaves journaled in said housings, and a ball secured to the pin 3, and having upon the lower end of its stem a flange as 9, projecting over the neck of the truck, substantially as and for the purpose set forth.

Signed at New York, in the county of New York and State of New York, this 2d day of June, A. D. 1899.

DENISON P. CHESEBRO.

Witnesses:
WM. H. CAPEL,
D. H. DECKER.